(12) United States Patent
Park et al.

(10) Patent No.: US 11,068,403 B2
(45) Date of Patent: Jul. 20, 2021

(54) DATA PROCESSING SYSTEM FOR PREFETCHING DATA TO BUFFER ENTRIES AND OPERATING METHOD OF THE DATA PROCESSING SYSTEM

(71) Applicants: SK hynix Inc., Icheon-si (KR); Purdue Research Foundation, West Lafayette, IN (US)

(72) Inventors: Il Park, Yongin-si (KR); T. N. Vijaykumar, West Lafayette, IN (US); Mithuna S Thottethodi, West Lafayette, IN (US); Nitin Delhi, West Lafayette, IN (US)

(73) Assignees: SK hynix Inc., Icheon-si (KR); Purdue Research Foundation, West Lafayette, IN (US)

( * ) Notice: Subject to any disclaimer, the term of this patent is extended or adjusted under 35 U.S.C. 154(b) by 21 days.

(21) Appl. No.: 16/591,221

(22) Filed: Oct. 2, 2019

(65) Prior Publication Data
US 2020/0371941 A1 Nov. 26, 2020

Related U.S. Application Data

(60) Provisional application No. 62/851,446, filed on May 22, 2019.

(51) Int. Cl.
*G06F 12/0862* (2016.01)

(52) U.S. Cl.
CPC .. *G06F 12/0862* (2013.01); *G06F 2212/1021* (2013.01); *G06F 2212/6024* (2013.01)

(58) Field of Classification Search
CPC ......... G06F 12/0862; G06F 2212/1021; G06F 2212/6024
See application file for complete search history.

(56) References Cited

U.S. PATENT DOCUMENTS 9,760,595 B1    9/2017  Goldman et al.
2019/0236018 A1* 8/2019  Kass ................... G06F 12/0891

* cited by examiner

*Primary Examiner* — Aracelis Ruiz
(74) *Attorney, Agent, or Firm* — William Park & Associates Ltd.

(57) ABSTRACT

A data processing system includes a memory device; buffer entries each including a plurality of slabs; a prefetch circuit configured to prefetch data from the memory device and store the data in the buffer entries; and processing circuits respectively corresponding to the slabs, each processing circuit being configured to sequentially demand-fetch and process data stored in corresponding slabs in the buffer entries, wherein each processing circuit checks, when demand-fetching data from a first slab among corresponding slabs, a prefetch trigger bit of a first buffer entry in which the first slab is included, determines, when it is determined that the prefetch trigger bit is set, whether all data stored in the slabs included in a second buffer entry is demand-fetched, and triggers, when it is determined that all the data is demand-fetched, the prefetch circuit to perform prefetch of subsequent data to the second buffer entry.

20 Claims, 7 Drawing Sheets

FIG.5

T51:
| | | FTB | CNT |
|---|---|---|---|
| ET1 | ▓▓▓ | 0 | 8 |
| ET2 | ▨▨▨ | 0 | 5 |
| ET3 | ▥▥▥ | 1 | 0 |

T52:
| | | FTB | CNT |
|---|---|---|---|
| ET1 | ▓▓▓ | 0 | 8 |
| ET2 | ▨▨▨ | 0 | 5 |
| ET3 | ▥▥▥ | 1 | 1 |

Initially demand fetch, trigger prefetch to ET1

T53:
| | | FTB | CNT |
|---|---|---|---|
| ET1 | Prefetch | 1 | 0 |
| ET2 | ▨▨▨ | 0 | 5 |
| ET3 | ▥▥▥ | 0 | 1 |

FIG.6

| | | FTB | CNT |
|---|---|---|---|
| T61 | ET1 | 0 | 6 |
| | ET2 | 0 | 5 |
| | ET3 | 1 | 0 |

| | | FTB | CNT |
|---|---|---|---|
| T62 | ET1 | 0 | 6 |
| | ET2 | 0 | 5 |
| | ET3 | 1 | 1 |

Initially demand fetch, not trigger prefetch to ET1

| | | FTB | CNT |
|---|---|---|---|
| T63 | ET1 | 0 | 8 |
| | ET2 | 0 | 7 |
| | ET3 | 1 | 3 |

| | | FTB | CNT |
|---|---|---|---|
| T64 | ET1 | 0 | 8 |
| | ET2 | 0 | 7 |
| | ET3 | 1 | 4 |

Demand fetch, trigger prefetch to ET1

Prefetch

| | | FTB | CNT |
|---|---|---|---|
| T65 | ET1 | 1 | 0 |
| | ET2 | 0 | 7 |
| | ET3 | 0 | 4 |

DATA PROCESSING SYSTEM FOR PREFETCHING DATA TO BUFFER ENTRIES AND OPERATING METHOD OF THE DATA PROCESSING SYSTEM

CROSS-REFERENCES TO RELATED APPLICATION

The present application claims priority under 35 U.S.C. § 119(a) to U.S. provisional application No. 62/851,446, filed on May 22, 2019, in the United States Patent and Trademark Office, which is incorporated herein by reference in its entirety.

BACKGROUND

1. Technical Field

Various embodiments generally relate to a data processing system and, more particularly, to a data processing system including a memory device and operating method of the data processing system.

2. Related Art

A data processing system may be an electronic system capable of processing data. Examples of electronic systems capable of processing data may include a personal computer, a laptop computer, a smartphone, a tablet computer, a digital camera, a game console, navigation devices, a virtual reality device, a wearable device, etc.

The data processing system may include a memory system. The memory system may be configured to store data processed in the data processing system. The memory system may configured to operate while being physically located within the data processing system, or may be designed to operate by being manufactured in a separable form and then being coupled to the data processing system later. The memory system may include a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

Also, the memory system may be manufactured as any one among various kinds of package types. For example, the memory system may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP) and a Wafer-level Stack Package (WSP).

SUMMARY

In an embodiment, a data processing system may be provided. The data processing system may include a memory device. The data processing system may include a buffer circuit including a plurality of buffer entries each including a plurality of slabs. The data processing system may include a prefetch circuit configured to control the memory device to prefetch data with the memory device from the memory device and control the buffer circuit to store the data in the buffer entries. The data processing system may include a plurality of processing circuits respectively corresponding to the plurality of slabs, each processing circuit being configured to sequentially demand-fetch and process data stored in the corresponding slabs in the buffer entries. Each of the processing circuit checks, when demand-fetching data from a first slab among corresponding slabs, a prefetch trigger bit of a first buffer entry in which the first slab is included, determines, when it is determined that the prefetch trigger bit is set, whether all data stored in a plurality of slabs included in a second buffer entry is demand-fetched, and triggers, when it is determined that all the data is demand-fetched, the prefetch circuit to perform prefetch of subsequent data to the second buffer entry.

In an embodiment, a method for operating a data processing system may be provided. The method may include demand-fetching and processing data stored in a first slab among a plurality of slabs included in a first buffer entry. The method may include checking a prefetch trigger bit of the first buffer entry when demand-fetching the data stored in the first slab. The method may include determining, when it is determined that the prefetch trigger bit is set, whether all data stored in a plurality of slabs included in a second buffer entry is demand-fetched. The method may include triggering, when it is determined that all the data is demand-fetched, prefetch of subsequent data to the second buffer entry.

BRIEF DESCRIPTION OF THE DRAWINGS

FIG. 5 is a representation of an example of a diagram to assist in the explanation of a method for operating the data processing system of FIG. 1.

FIG. 6 is a representation of an example of a diagram to assist in the explanation of a method for operating the data processing system of FIG. 1.

DETAILED DESCRIPTION

Figure 1:
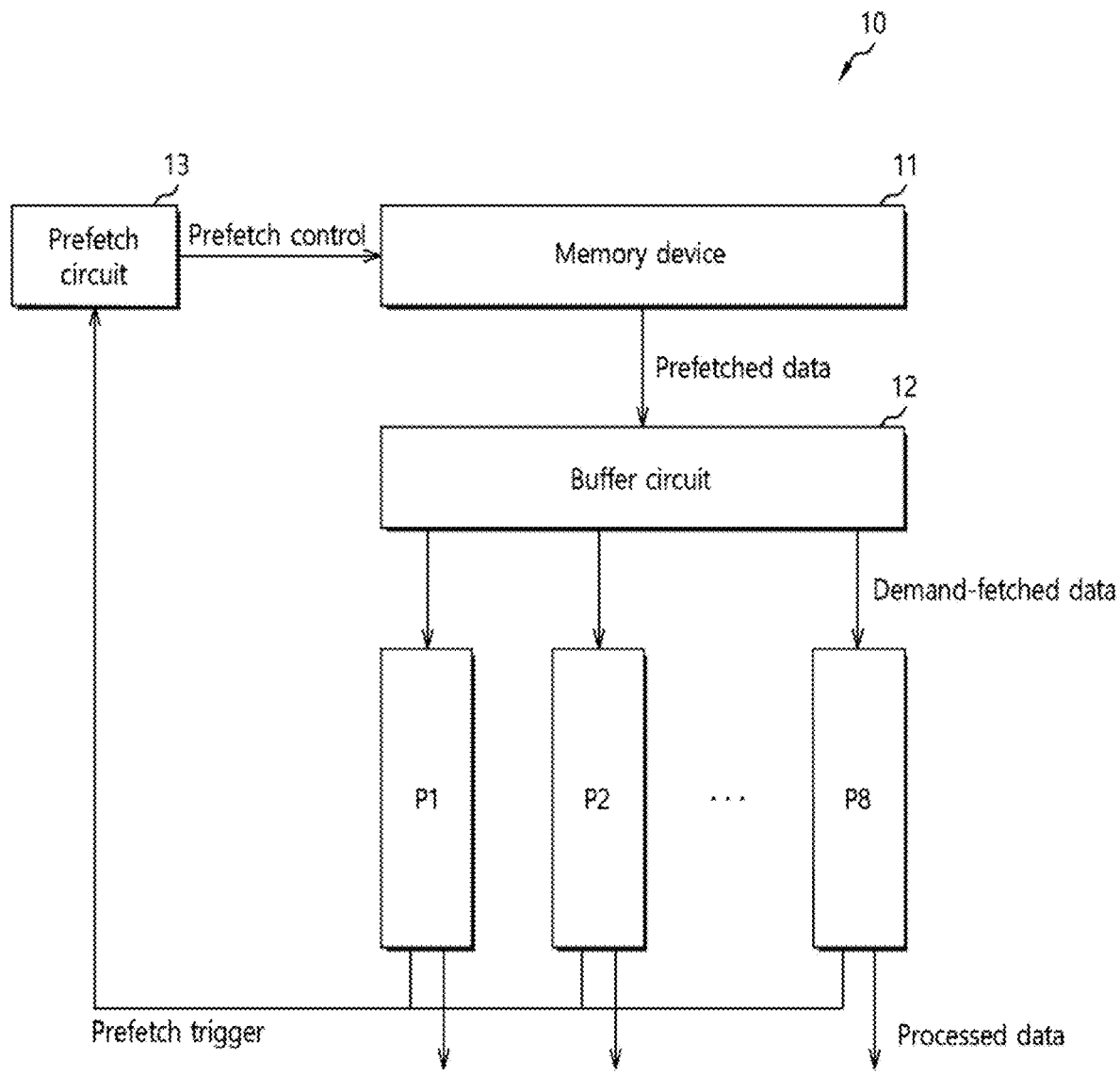
FIG. 1 is a block diagram schematically illustrating a representation of an example of a data processing system in accordance with an embodiment.

In the present disclosure, advantages, features and methods for achieving them will become more apparent after a reading of the following examples of embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data processing system and an operating method thereof will be described below with reference to the accompanying drawings through various examples of embodiments.

Various embodiments may be directed to a data processing system and an operating method thereof, capable of improving data processing speed through prefetch and parallel processing and preventing waste of resources and power due to redundant prefetch.

The data processing system and the operating method thereof according to the embodiments may improve data processing speed through prefetch and parallel processing and may prevent waste of resources and power due to redundant prefetch.

FIG. 1 is a block diagram schematically illustrating a representation of an example of a data processing system 10 in accordance with an embodiment.

Referring to FIG. 1, the data processing system 10 may process data stored in a memory device 11 and output processed data to an outside. As will be described later, in the data processing system 10, since data is prefetched from the memory device 11, sent to a buffer circuit 12, and a plurality of processing circuits P1 to P8 process data of the buffer circuit 12 in parallel, excellent performance may be exhibited in processing big data. In particular, since the data processing system 10 does not trigger redundant prefetching of the data from the memory device 11 to the buffer circuit 12, it is possible to efficiently use resources of the data processing system 10.

The data processing system 10 may include the memory device 11, the buffer circuit 12, a prefetch circuit 13 and the plurality of processing circuits P1 to P8.

The memory device 11 may store data. The data stored in the memory device 11 may be prefetched and may be transmitted to the buffer circuit 12, according to the control of the prefetch circuit 13. That is to say, the memory device 11 may read data to be prefetched and transmit the read data to the buffer circuit 12, according to the control of the prefetch circuit 13. In an embodiment, the prefetch circuit 13 may be implemented with software, hardware, or any combination thereof.

The buffer circuit 12 may store the data prefetched (that is, read) from the memory device 11, according to the control of the prefetch circuit 13.

Figure 2:
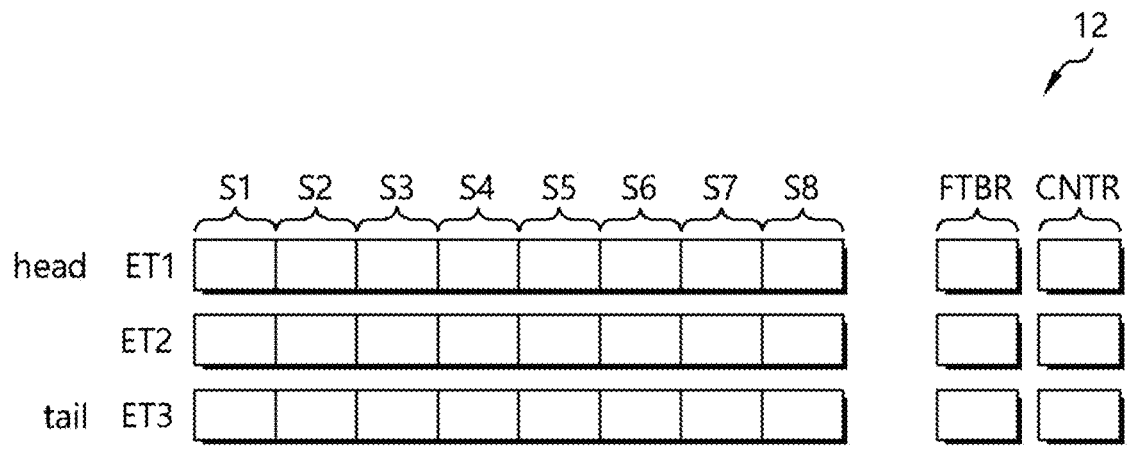
FIG. 2 is a block diagram illustrating a representation of an example of the buffer circuit illustrated in FIG. 1.

FIG. 2 is a block diagram illustrating a representation of an example of the buffer circuit 12 illustrated in FIG. 1.

Referring to FIG. 2, the buffer circuit 12 may include buffer entries ET1 to ET3. Each buffer entry may be a unit by which data is prefetched from the memory device 11 of FIG. 1 and is stored. In other words, each time data is prefetched from the memory device 11, the prefetched data may fill one buffer entry.

The buffer entries ET1 to ET3 may sequentially store prefetched data according to a predetermined prefetch sequence. The buffer entries ET1 to ET3 may construct, for example, an annular queue. For example, among the buffer entries ET1 to ET3, the buffer entry ET1 may be a head and the buffer entry ET3 may be a tail. Therefore, prefetched data may be stored in the sequence from the buffer entry ET1 to the buffer entry ET3, and, after being stored in the buffer entry ET3, may be stored in the buffer entry ET1. At a certain time, a next buffer entry in which prefetched data is to be stored according to the prefetch sequence may be defined as a prefetch target buffer entry.

For illustration purposes only, the buffer circuit 12 may include a total of three buffer entries ET1 to ET3, but it is to be noted that the number of buffer entries is not limited thereto. According to an embodiment, the buffer circuit 12 may include a plurality of buffer entries depending on the capacity of the buffer circuit 12.

Each of the buffer entries ET1 to ET3 may include slabs S1 to S8. The slabs S1 to S8 of each of the buffer entries ET1 to ET3 may correspond to the processing circuits P1 to P8, respectively, of FIG. 1. For example, the first slab S1 of each of the buffer entries ET1 to ET3 may correspond to the first processing circuit P1, and the second slab S2 of each of the buffer entries ET1 to ET3 may correspond to the second processing circuit P2. When the data processing system 10 of FIG. 1 includes eight processing circuits P1 to P8, each of the buffer entries ET1 to ET3 may include eight slabs S1 to S8.

However, it is for illustration purposes only that each buffer entry includes eight slabs S1 to S8, and it is to be noted that the embodiments are not limited thereto. According to an embodiment, each buffer entry may include a plurality of slabs. According to an embodiment, each buffer entry may include slabs as many as the number of processing circuits included in the data processing system 10.

Each of the slabs S1 to S8 may be a unit by which data stored in each buffer entry is demand-fetched. The data prefetched and stored in each of the slabs S1 to S8 may be demand-fetched and processed by a corresponding processing circuit.

The buffer circuit 12 may further include a prefetch trigger bit region FTBR and a demand fetch count region CNTR.

The prefetch trigger bit region FTBR may be a region in which the prefetch trigger bit of each of the buffer entries ET1 to ET3 is stored. A prefetch trigger bit may indicate that subsequent data should be prefetched and stored to a next buffer entry but has not been prefetched yet.

Hereafter, "setting" a prefetch trigger bit in the prefetch trigger bit region FTBR may mean to store a '1', value representing a logic 'high' level, in the prefetch trigger bit region FTBR. Hereafter, "clearing" a prefetch trigger bit in the prefetch trigger bit region FTBR may mean to store a '0', value representing a logic 'low' level, in the prefetch trigger bit region FTBR. However, according to an embodiment, the values of a prefetch trigger bit are not limited thereto and other values may be used. Further, the logic levels of the values may be different from or the opposite of those described. For example, a signal described as having a logic "high" level may alternatively have a logic "low" level, and a signal described as having a logic "low" level may alternatively have a logic "high" level.

The demand fetch count region CNTR may be a region in which the demand fetch count of each of the buffer entries ET1 to ET3 is stored. A demand fetch count may be increased each time data stored in a corresponding buffer entry is demand-fetched. A demand fetch count may be increased to a maximum demand fetch count. The maximum demand fetch count may correspond to the number of slabs included in each buffer entry. Therefore, when each buffer entry includes eight slabs S1 to S8, the maximum demand fetch count may be 8.

The prefetch trigger bit region FTBR and the demand fetch count region CNTR may be implemented by various storage elements, for example, fuses, registers, latches or flip-flops, etc.

According to an embodiment, the prefetch trigger bit region FTBR and the demand fetch count region CNTR may exist as a separate memory outside the buffer circuit 12.

Referring again to FIG. 1, the memory device 11 and/or the buffer circuit 12 may include a nonvolatile memory device and/or a volatile memory device. The nonvolatile memory device may include a flash memory device such as a NAND flash or a NOR flash, an FeRAM (ferroelectric random access memory), a PCRAM (phase change random access memory), an MRAM (magnetic random access memory) or an ReRAM (resistive random access memory). The volatile memory device may include a DRAM (dynamic random access memory) or an SRAM (static random access memory).

The memory device 11 and/or the buffer circuit 12 may include an HMC (hybrid memory cube) or an HBM (high bandwidth memory).

When any one of the processing circuits P1 to P8 triggers a prefetch, the prefetch circuit 13 may control the prefetch of data from the memory device 11 by the unit of buffer entry and control the storage of the prefetched data in a prefetch target buffer entry of the buffer circuit 12, and may control the setting of the prefetch trigger bit of the prefetch target buffer entry. The prefetch circuit 13 may determine a prefetch target buffer entry according to the predetermined prefetch sequence among the buffer entries ET1 to ET3, as described above.

The word "predetermined" as used herein with respect to a parameter, such as a predetermined prefetch sequence, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Each of the plurality of processing circuits P1 to P8 may demand-fetch and process data stored in the buffer circuit 12. Namely, each of the plurality of processing circuits P1 to P8 may demand-fetch data by reading the data from the buffer circuit 12 and storing the data in an internal register (not shown), and may process the data stored in the internal register. Each of the processing circuits P1 to P8 may include a central processing unit, a graphic processing unit, a microprocessor, an application processor, an accelerated processing unit or an operating system.

For example, each processing circuit may sequentially demand-fetch the data stored in corresponding slabs of the buffer entries ET1 to ET3 of the buffer circuit 12, according to the prefetch sequence. That is to say, since data is prefetched in the buffer entries ET1 to ET3 according to the prefetch sequence, each processing circuit may demand-fetch data from corresponding slabs according to the prefetch sequence.

When demand-fetching data from a first slab among corresponding slabs, each processing circuit may check the prefetch trigger bit of a buffer entry in which the first slab is included. The prefetch trigger bit may indicate that subsequent data should be prefetched for a next buffer entry, that is, a prefetch target buffer entry, but is not prefetched yet. Therefore, when it is determined that the prefetch trigger bit is set, each processing circuit may determine whether prefetch to a prefetch target buffer entry according to the above-described prefetch sequence is possible. For example, each processing circuit may determine whether prefetch to the prefetch target buffer entry is possible, by determining whether all the data stored in the slabs included in the prefetch target buffer entry is demand-fetched. When it is determined that all the data stored in the prefetch target buffer entry is demand-fetched, each processing circuit may trigger the prefetch circuit 13 to perform controlling to prefetch for the prefetch target buffer entry.

According to an embodiment, when triggering prefetch of subsequent data to the prefetch target buffer entry, each processing circuit may set the prefetch trigger bit of the prefetch target buffer entry instead of the prefetch circuit 13.

When triggering prefetch of subsequent data to the prefetch target buffer entry, each processing circuit may clear the prefetch trigger bit of the buffer entry which is demand-fetched immediately before.

When it is determined that a prefetch trigger bit is not set, that is, when it is determined that a prefetch trigger bit is cleared, each processing circuit may not trigger prefetching of subsequent data for the prefetch target buffer entry.

When it is determined that not all the data stored in the prefetch target buffer entry is demand-fetched, each processing circuit might not trigger a prefetching of subsequent data for the prefetch target buffer entry until the data for that prefetch target buffer entry has been demand-fetched.

When demand-fetching the data stored in a corresponding slab, each processing circuit may increase the demand fetch count of a buffer entry in which the corresponding slab is included and corresponds to.

Each processing circuit may determine whether all the data stored in a prefetch target buffer entry has been demand-fetched, by determining whether the demand fetch count of the prefetch target buffer entry has reached a maximum demand fetch count.

According to an embodiment, when it is determined that a prefetch trigger bit is set, each processing circuit may determine whether prefetch to a prefetch target buffer entry is possible, by determining whether the prefetch target buffer entry is empty. Even when it is determined that the prefetch target buffer entry is empty, each processing circuit may trigger a prefetch for the prefetch target buffer entry.

The data processing system 10 may include a PIM (processor-in-memory) or a PNM (processor-near-memory).

As a result, in a data processing operation in accordance with an embodiment, prefetching of a prefetch target buffer entry may be performed while a previous buffer entry is demand-fetched according to the prefetch sequence. Thus, it may be possible to prevent resources and power from being wasted in the case where prefetching occurs to quickly, that is, redundant prefetching, is performed. Since prefetching of the prefetch target buffer entry is not triggered until all the data previously prefetched to the prefetch target buffer entry is demand-fetched, data to be demand-fetched may be held.

In this way, because the data processing system 10 effectively executes a prefetch, it may be possible to quickly process data.

Figure 3:
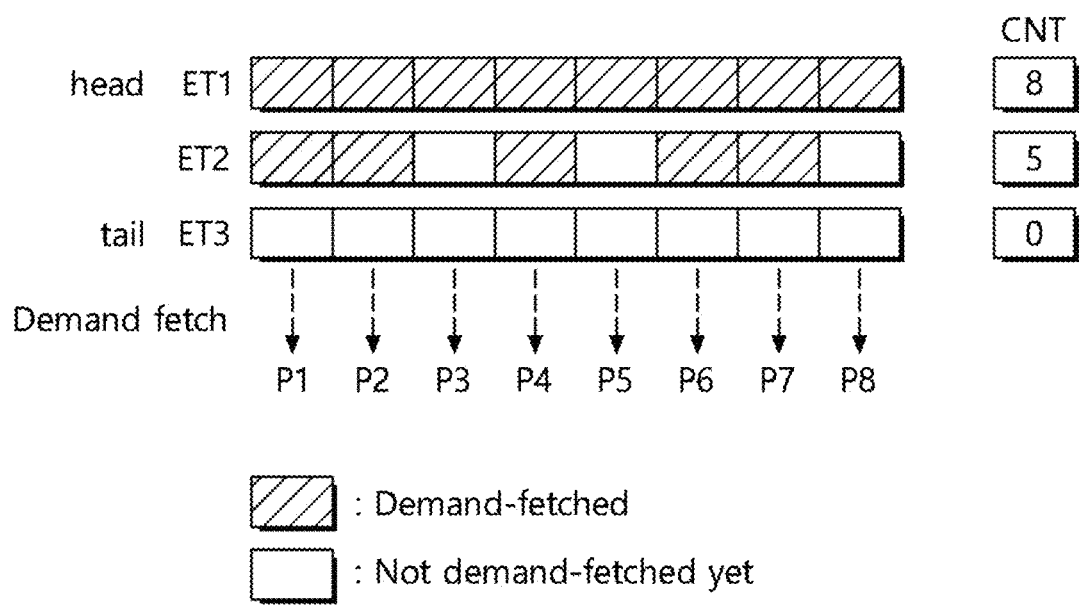
FIG. 3 is a representation of an example of a diagram to assist in the explanation of a method for the processing circuits of FIG. 1 to perform demand-fetch from buffer entries.

FIG. 3 is a representation of an example of a diagram to assist in the explanation of a method for the processing circuits P1 to P8 of FIG. 1 to perform demand-fetching from the buffer entries ET1 to ET3.

Before making an explanation, it is to be noted that, hereafter, demand-fetching a buffer entry or a slab may mean that a corresponding processing circuit demand-fetches the data stored in the buffer entry or the slab. For example, it is to be noted that demand-fetching a buffer entry or a slab may mean that a corresponding processing circuit reads the data stored in the buffer entry or the slab and stores the read data in an internal register. The data stored in a buffer entry or a slab may be data which is prefetched from the memory device 11 to the buffer entry or the slab as described above.

The respective processing circuits P1 to P8 may sequentially demand-fetch and process data from slabs corresponding to the data in the buffer entries ET1 to ET3. A demand-fetch sequence may be the same as the prefetch sequence, and accordingly, may be a sequence from a head, that is, the buffer entry ET1, to a tail, that is, the buffer entry ET3. Each of the processing circuits P1 to P8 may, after demand-fetching and completely processing data from a corresponding slab in a certain buffer entry, demand-fetch and process a slab of data corresponding to a next buffer entry.

For example, first, it is assumed that, in FIG. 3, the buffer entries ET1 to ET3 are full of the data prefetched from the memory device 11. All the slabs of the buffer entry ET1 may be in a state in which they are demand-fetched by the processing circuits P1 to P8. Since a demand fetch count CNT is increased each time the data stored in a corresponding buffer entry is demand-fetched, the demand fetch count CNT of the buffer entry ET1 may be 8 as a maximum demand fetch count. Hereafter, when all the slabs of a certain buffer entry are demand-fetched, that is, when a demand fetch count CNT reaches a maximum demand fetch count, it may be mentioned that the corresponding buffer entry has been completely demand-fetched.

Five slabs of the buffer entry ET2 may be demand-fetched by the processing circuits P1, P2, P4, P6 and P7, respectively. The processing circuits P1, P2, P4, P6 and P7 may, after completely processing the data demand-fetched from the buffer entry ET1, demand-fetch the buffer entry ET2. Three slabs of the buffer entry ET2 might not be demand-fetched yet by the processing circuits P3, P5 and P8. At this time, the processing circuits P3, P5 and P8 may be processing the data demand-fetched from the buffer entry ET1. In this case, the demand fetch count CNT of the buffer entry ET2 may be 5.

Figure 4:
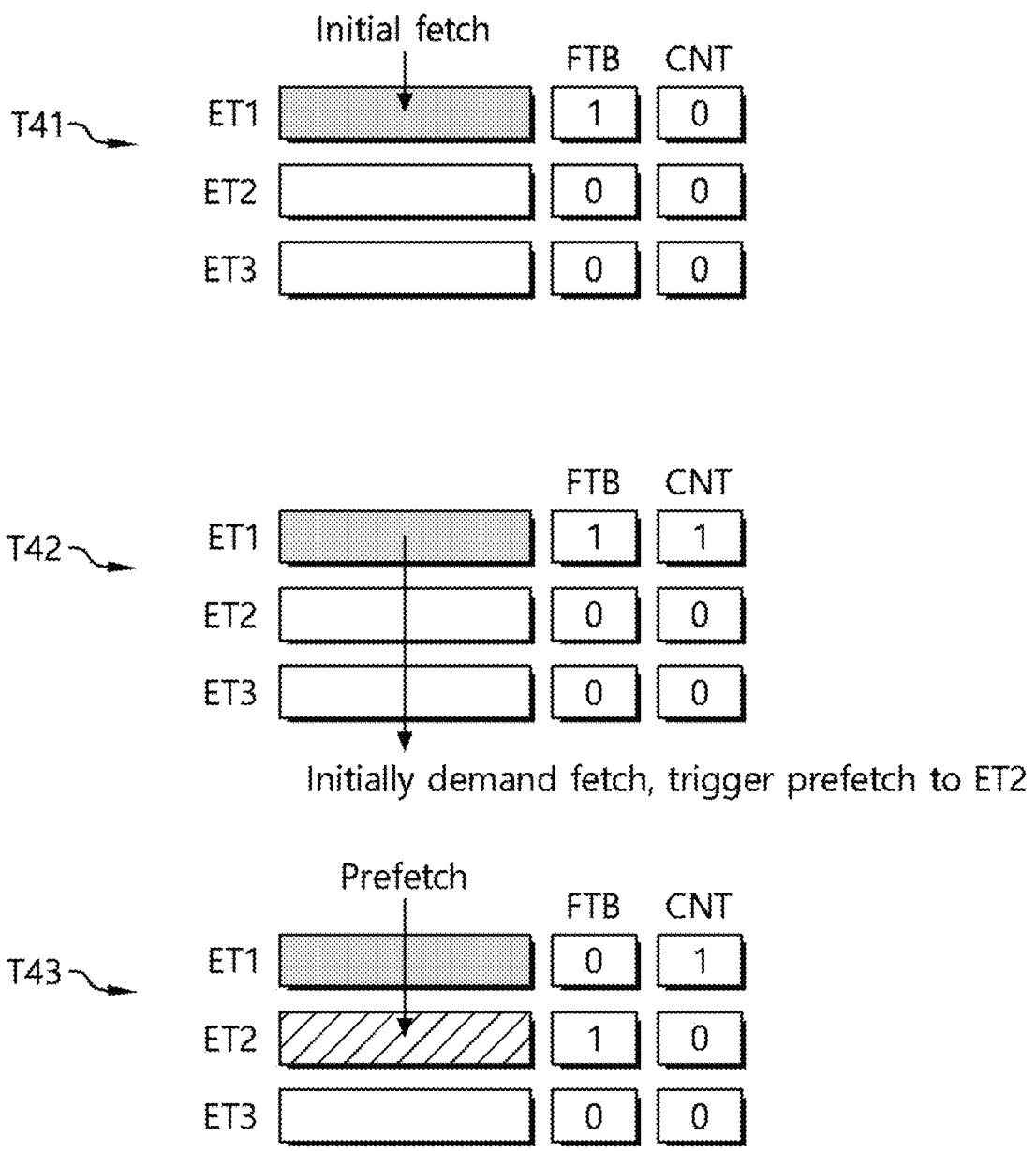
FIG. 4 is a representation of an example of a diagram to assist in the explanation of a method for operating the data processing system of FIG. 1.

FIG. 4 is a representation of an example of a diagram to assist in the explanation of a method for operating the data processing system 10 of FIG. 1. In the drawings to be described hereinbelow, illustration of the slabs included in the buffer entries ET1 to ET3 will be omitted. Even so, in the following descriptions, demand-fetching each buffer entry may mean that a certain processing circuit demand-fetches from a corresponding slab in the corresponding buffer entry.

Referring to FIG. 4, a situation when initially starting a data processing operation will be described. In other words, the buffer entries ET1 to ET3 may be empty.

First, at a time T41, the memory device 11 may initially fetch data by reading data to be prefetched and transmit the read data to the buffer circuit 12 to store the data in the buffer entry ET1, according to the control of the prefetch circuit 13. If the data is stored in the buffer entry ET1, the prefetch trigger bit FTB of the buffer entry ET1 may be set to 1 and the demand fetch count CNT may be stored as 0. The remaining buffer entries ET2 and ET3 may be empty. The prefetch trigger bits FTB of the remaining buffer entries ET2 and ET3 may be cleared to 0, and the demand fetch counts CNT may be stored as 0.

At a time T42, a certain processing circuit among the processing circuits P1 to P8 may initially demand-fetch a corresponding slab of data in the buffer entry ET1. Thus, the demand fetch count CNT of the buffer entry ET1 may be increased from 0 to 1.

The processing circuit which initially demand-fetches the buffer entry ET1 may check that the prefetch trigger bit FTB of the buffer entry ET1 is set, and, in order to trigger a prefetch for the next buffer entry ET2, that is, the prefetch target buffer entry ET2, the processing circuit may determine whether the prefetch target buffer entry ET2 is empty or is completely demand-fetched.

Whether the prefetch target buffer entry ET2 is empty may be known through various methods. For example, a flag indicating whether a corresponding buffer entry is empty or full may be placed for each buffer entry, and, by referring to a corresponding flag, it may be determined that a corresponding buffer entry is empty. For another example, when both the prefetch trigger bit FTB and the demand fetch count CNT of a buffer entry are 0, it may be determined that a corresponding buffer entry is empty.

According to the above-described example of a method, since both the prefetch trigger bit FTB and the demand fetch count CNT of the prefetch target buffer entry ET2 are 0, the processing circuit may determine that the prefetch target buffer entry ET2 is empty. Accordingly, the processing circuit may trigger the prefetch circuit 13 to control performance of the memory device 11 to perform a prefetch to the prefetch target buffer entry ET2. The method of triggering prefetch by determining a case where the prefetch target buffer entry ET2 is completely demand-fetched will be described in another example to be described later.

At a time T43, after prefetch to the prefetch target buffer entry ET2 is triggered, the prefetch trigger bit FTB of the buffer entry ET1 may be cleared to 0. Therefore, it may be possible to prevent processing circuits which subsequently demand-fetch the buffer entry ET1, from triggering prefetch to the next buffer entry ET2.

The prefetch circuit 13 may control the memory device 11 to prefetch subsequent data in response to the trigger of the processing circuit, and control storage of the prefetched data to store the prefetched data in the buffer entry ET2.

If the prefetched data is stored in the buffer entry ET2, the prefetch trigger bit FTB of the buffer entry ET2 may be set to 1. Therefore, when a certain processing circuit among the processing circuits P1 to P8 initially performs a demand-fetch of a corresponding slab of data in the buffer entry ET2, the corresponding processing circuit may check that the prefetch trigger bit FTB of the buffer entry ET2 is set. Then, by determining that the next buffer entry ET3 is empty as a prefetch target buffer entry, prefetch of subsequent data to the prefetch target buffer entry ET3 may be triggered.

FIG. 5 is a representation of an example of a diagram to assist in the explanation of a method for operating the data processing system 10 of FIG. 1. FIG. 5 illustrates a situation in which prefetch to a prefetch target buffer entry is possible because the prefetch target buffer entry is not empty but is completely demand-fetched. In FIG. 5, the patterns filled in the buffer entries ET1 to ET3 may mean different data which have been prefetched to the corresponding buffer entries.

Referring to FIG. 5, first, at a time T51, the buffer entry ET1 may be completely demand-fetched for all of the slabs in the buffer entry ET1 (i.e., S1 to S8), and accordingly, the demand fetch count CNT of the buffer entry ET1 may be in a state in which it has reached 8 as the maximum demand fetch count. The buffer entry ET2 may be demand-fetched by five processing circuits, and accordingly, the demand fetch count CNT may be in a state in which it is 5. Since the buffer entry ET3 has not been demand-fetched yet by any processing circuit after prefetched data is stored therein, the prefetch trigger bit FTB may be in a state in which it is set to 1 and the demand fetch count CNT may be 0.

At a time T52, a certain processing circuit among the processing circuits P1 to P8 may initially demand-fetch a corresponding slab in the buffer entry ET3. Thus, the demand fetch count CNT of the buffer entry ET3 may be increased from 0 to 1.

The processing circuit which has initially demand-fetched the buffer entry ET3 may check that the prefetch trigger bit FTB of the buffer entry ET3 is set. Therefore, in order to trigger prefetch of subsequent data to the next buffer entry ET1, that is, the prefetch target buffer entry ET1, the corresponding processing circuit may determine whether the prefetch target buffer entry ET1 is empty or whether the prefetch target buffer entry ET1 is completely demand-fetched. Since the demand fetch count CNT of the prefetch target buffer entry ET1 is in a state in which it has reached the maximum demand fetch count, the processing circuit may determine that the prefetch target buffer entry ET1 has been completely demand-fetched. Therefore, even though the prefetch target buffer entry ET1 is not empty, the processing circuit may trigger the prefetch circuit 13 to perform prefetch of subsequent data to the prefetch target buffer entry ET1.

At a time T53, after prefetch to the prefetch target buffer entry ET1 is triggered, the prefetch trigger bit FTB of the buffer entry ET3 may be cleared.

The prefetch circuit 13 may control the memory device 11 to prefetch data from the memory device 11 in response to the trigger of the processing circuit, and store the prefetched data in the buffer entry ET1. If the prefetched data is stored in the buffer entry ET1, the prefetch trigger bit FTB of the buffer entry ET1 may be set to 1 and the demand fetch count CNT of the buffer entry ET1 may be cleared to 0.

FIG. 6 is a representation of an example of a diagram to assist in the explanation of a method for operating the data processing system 10 of FIG. 1. FIG. 6 illustrates a case where prefetch to a prefetch target buffer entry is impossible because the prefetch target buffer entry is not empty and has not been completely demand-fetched.

Referring to FIG. 6, first, at a time T61, the buffer entry ET1 may be demand-fetched by six processing circuits, and accordingly, the demand fetch count CNT may be in a state in which it is 6. The buffer entry ET2 may be demand-fetched by five processing circuits, and accordingly, the demand fetch count CNT may be in a state in which it is 5. Since the buffer entry ET3 has not been demand-fetched yet by any processing circuit after prefetched data has been stored therein, the prefetch trigger bit FTB may be in a state in which it is set to 1 and the demand fetch count CNT may be 0.

At a time T62, a certain processing circuit among the processing circuits P1 to P8 may initially demand-fetch a corresponding slab in the buffer entry ET3. Thus, the demand fetch count CNT of the buffer entry ET3 may be increased from 0 to 1.

The processing circuit which has initially demand-fetched the buffer entry ET3 may check that the prefetch trigger bit FTB of the buffer entry ET3 is set, and, in order to trigger a prefetch of subsequent data to the next buffer entry ET1, that is, the prefetch target buffer entry ET1, may determine whether the prefetch target buffer entry ET1 is empty or whether the prefetch target buffer entry ET1 has been completely demand-fetched. Since the demand fetch count CNT of the prefetch target buffer entry ET1 is 6 (and the buffer entry ET1 has, for example, 8 slabs), the processing circuit may determine that the prefetch target buffer entry ET1 is not empty and is not completely demand-fetched for all of the slabs in the buffer entry ET1 (i.e., S1 to S8). Accordingly, the processing circuit may not trigger the prefetch circuit 13 to perform prefetch to the prefetch target buffer entry ET1. Therefore, in the prefetch target buffer entry ET1, data which is not demand-fetched yet may be held as it is.

Since prefetch to the prefetch target buffer entry ET1 is not triggered, the prefetch trigger bit FTB of the buffer entry ET3 may be still held as 1.

At a time T63, with the lapse of time, the buffer entry ET3 may be demand-fetched by three processing circuits, and accordingly, the demand fetch count CNT may be in a state in which it is 3. After the demand fetch count CNT of the buffer entry ET3 becomes 3, the prefetch target buffer entry ET1 may have just been completely demand-fetched, and accordingly, the demand fetch count CNT of the buffer entry ET1 may be in a state in which it has reached 8 as the maximum demand fetch count. Since the demand fetch count CNT of the prefetch target buffer entry ET1 has not reached 8 while the three processing circuits demand-fetch the buffer entry ET3, the corresponding three processing circuits have not triggered a prefetch to the prefetch target buffer entry ET1. Therefore, the prefetch trigger bit FTB of the buffer entry ET3 may be still in a state in which it is set to 1.

Meanwhile, the buffer entry ET2 may be demand-fetched by seven processing circuits, and accordingly, the demand fetch count CNT may be in a state in which it is 7.

At a time T64, a certain processing circuit among the processing circuits P1 to P8 may demand-fetch a corresponding slab in the buffer entry ET3. Thus, the demand fetch count CNT of the buffer entry ET3 may be increased from 3 to 4. The processing circuit which has demand-fetched the buffer entry ET3 may check that the prefetch trigger bit FTB of the buffer entry ET3 is set, and may check the demand fetch count CNT of the prefetch target buffer entry ET1. Since the demand fetch count CNT of the prefetch target buffer entry ET1 is in a state in which it has reached the maximum demand fetch count, the processing circuit may determine that the prefetch target buffer entry ET1 has been completely demand-fetched. Accordingly, the processing circuit may trigger the prefetch circuit 13 to control the memory device 11 to perform a prefetch to the prefetch target buffer entry ET1.

At a time T65, after a prefetch to the prefetch target buffer entry ET1 is triggered, the prefetch trigger bit FTB of the buffer entry ET3 may be cleared.

The prefetch circuit 13 may control the memory device 11 to prefetch data from the memory device 11 in response to the trigger of the processing circuit, and control the buffer circuit 12 to store the prefetched data in the buffer entry ET1. If the prefetched data is stored in the buffer entry ET1, the prefetch trigger bit FTB of the buffer entry ET1 may be set to 1 and the demand fetch count CNT of the buffer entry ET1 may be cleared.

Figure 7:
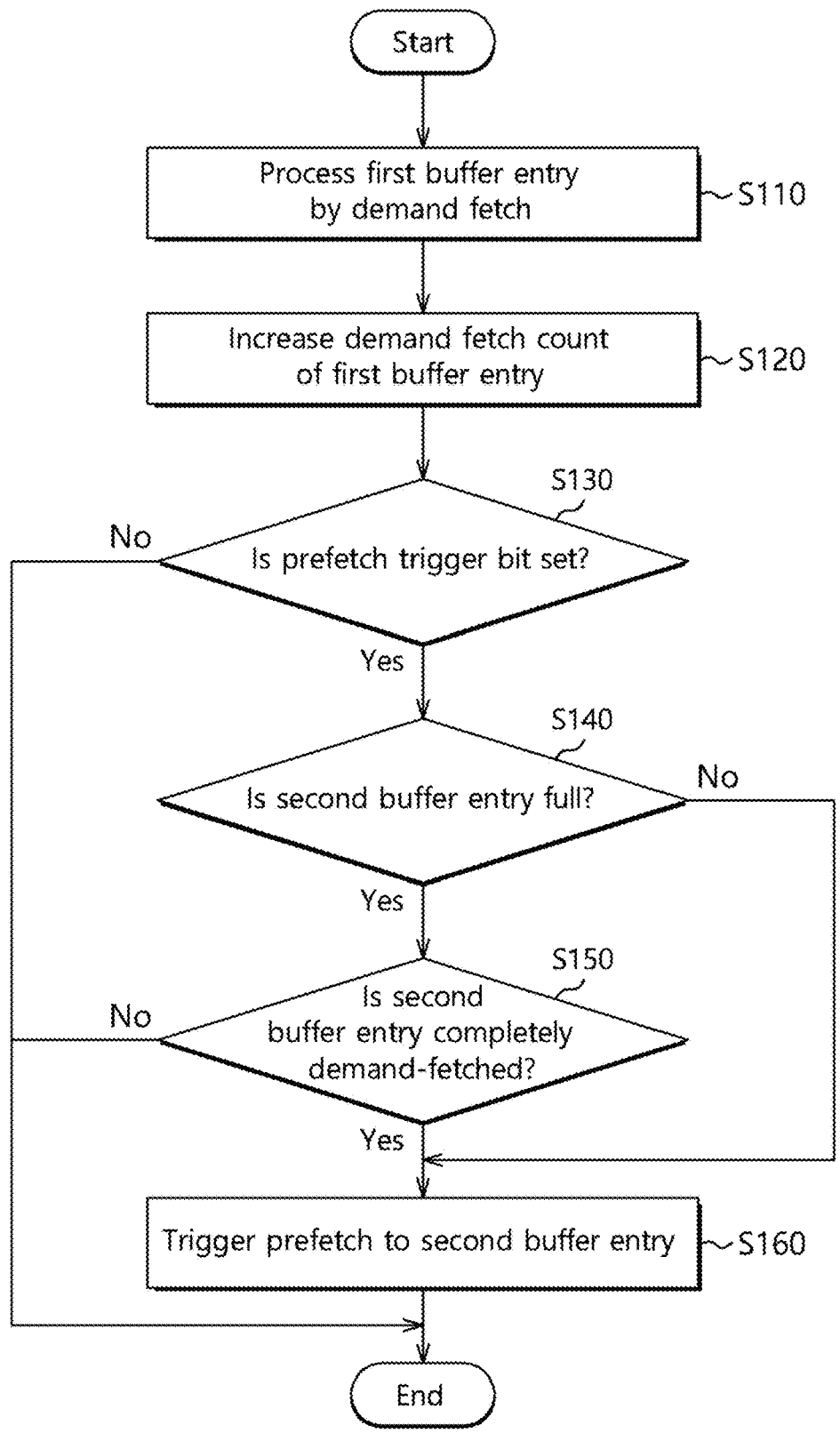
FIG. 7 is a representation of an example of a flow chart to assist in the explanation of a method for operating each processing circuit of the data processing system of FIG. 1.

FIG. 7 is a representation of an example of a flow chart to assist in the explanation of a method for operating each processing circuit of the data processing system 10 of FIG. 1. Each of the processing circuits P1 to P8 of FIG. 1 may operate according to the procedure illustrated in FIG. 7. Hereinbelow, the procedure of FIG. 7 will be described by taking the processing circuit P1 as an example.

Referring to FIG. 7, at step S110, the processing circuit P1 may demand-fetch and process a first buffer entry. The first buffer entry may be any one according to a demand fetch sequence among the buffer entries ET1 to ET3. For example, the processing circuit P1 may read the data stored in the corresponding slab S1 of the first buffer entry and store the read data in an internal register, and may process the data stored in the internal register.

At step S120, the processing circuit P1 may increase the demand fetch count of the first buffer entry.

At step S130, the processing circuit P1 may determine whether the prefetch trigger bit is set, by checking the prefetch trigger bit of the first buffer entry. When the prefetch trigger bit of the first buffer entry is set, the procedure may proceed to step S140. When the prefetch trigger bit of the first buffer entry is not set, the procedure may be ended.

At the step S140, the processing circuit P1 may determine whether a second buffer entry is full. The second buffer entry may be a buffer entry which is subsequent to the first buffer entry in a prefetch sequence. When the second buffer entry is full, the procedure may proceed to step S150. When the second buffer entry is empty, the procedure may proceed to step S160.

At the step S150, the processing circuit P1 may determine whether the second buffer entry is completely demand-fetched. For example, the processing circuit P1 may determine whether all the data stored in the slabs of the second buffer entry is demand-fetched. For example, when the demand fetch count of the second buffer entry has reached a maximum demand fetch count, the processing circuit P1 may determine that the second buffer entry is completely demand-fetched. When the second buffer entry is completely demand-fetched, the procedure may proceed to the step S160. When the second buffer entry is not completely demand-fetched, the procedure may be ended.

At the step S160, the processing circuit P1 may trigger the prefetch circuit 13 to control the performance of prefetching the subsequent data to the second buffer entry.

Figure 8:
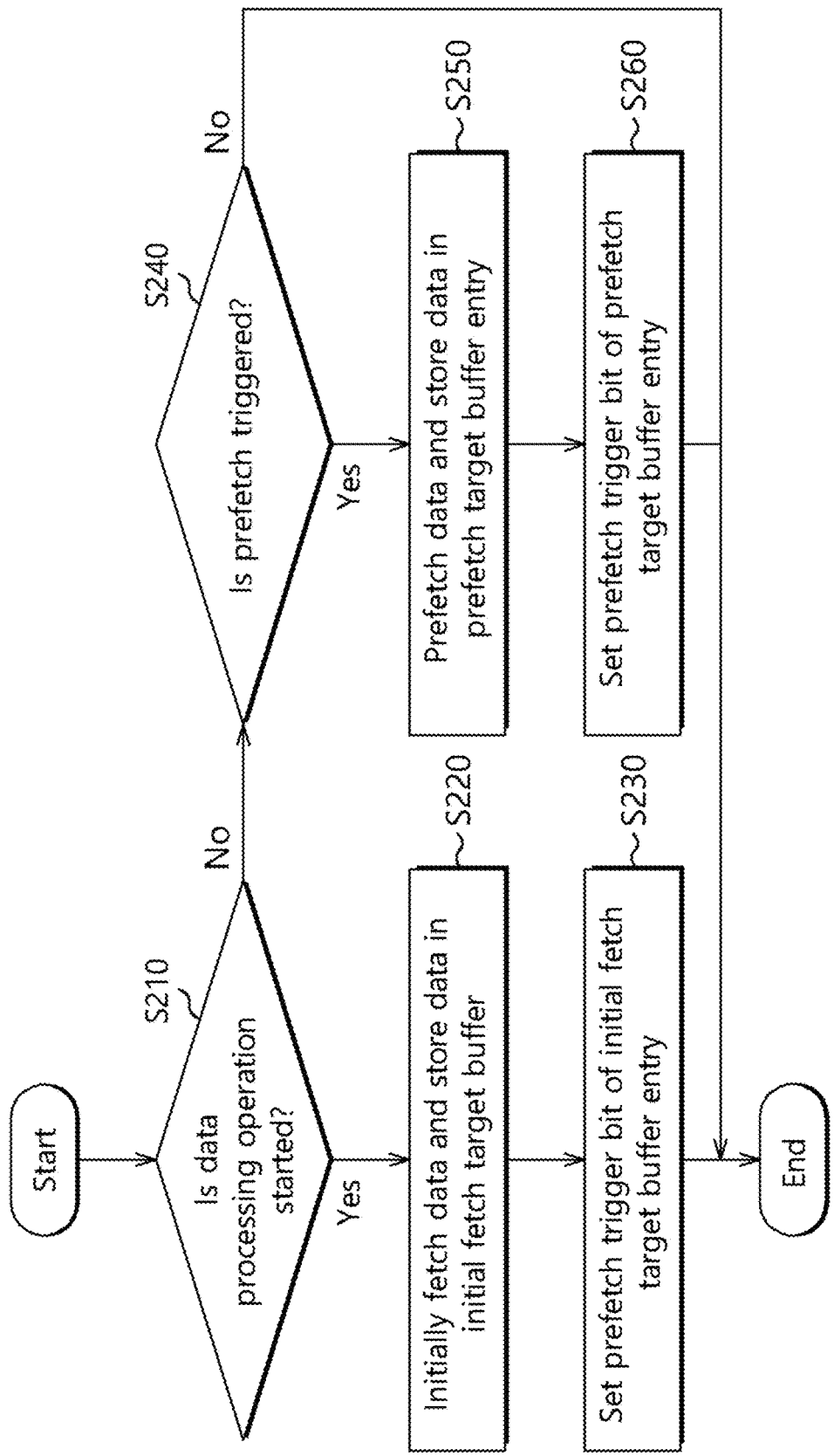
FIG. 8 is a representation of an example of a flow chart to assist in the explanation of a method for operating the prefetch circuit of the data processing system of FIG. 1.

FIG. 8 is a representation of an example of a flow chart to assist in the explanation of a method for operating the prefetch circuit 13 of the data processing system 10 of FIG. 1.

Referring to FIG. 8, at step S210, the prefetch circuit 13 may determine whether a data processing operation of the data processing system 10 has just started. When the data processing operation has just started, the procedure may proceed to step S220. When the data processing operation has not begun or just started but is in a situation in which it is being performed, the procedure may proceed to step S240.

At the step S220, the prefetch circuit 13 may control the memory device 11 to initially fetch data from the memory device 11 and store the data in an initial fetch target buffer entry, that is, the buffer entry ET1 of the buffer circuit 12. The buffer entry ET1 may be the initial fetch target buffer entry as the head of an annular queue.

At step S230, the prefetch circuit 13 may set the prefetch trigger bit of the initial fetch target buffer entry ET1 to indicate that the entry ET1 has not been demand fetched yet.

At the step S240, the prefetch circuit 13 may determine whether a prefetch is triggered from any one of the processing circuits P1 to P8. When prefetch is triggered, the procedure may proceed to step S250. When prefetch is not triggered, the procedure may be ended.

At the step S250, the prefetch circuit 13 may control the memory devices 11 to prefetch data from the memory device 11 and store the prefetched data in a prefetch target buffer entry. The prefetch target buffer entry may be a buffer entry in which prefetched data is to be subsequently stored, according to a predetermined prefetch sequence, among the buffer entries ET1 to ET3. For example, the prefetch circuit 13 may memorize the predetermined prefetch sequence, and may determine a prefetch target buffer entry. For another example, the prefetch circuit 13 may receive information on a prefetch target buffer entry from a processing circuit which triggers a prefetch.

At step S260, the prefetch circuit 13 may set the prefetch trigger bit of the prefetch target buffer entry to indicate that this entry has not been demand fetched yet.

While various embodiments have been described above, it will be understood to those skilled in the art that the embodiments described are examples only. Accordingly, the data processing system and the operating method thereof described herein should not be limited based on the described embodiments.

What is claimed is:

1. A data processing system comprising:
   a memory device;
   a buffer circuit including a plurality of buffer entries each including a plurality of slabs;
   a prefetch circuit configured to control the memory device to prefetch data from the memory device and control the buffer circuit to store the data in the buffer entries; and
   a plurality of processing circuits respectively corresponding to the plurality of slabs, each processing circuit being configured to sequentially demand-fetch and process data stored in the corresponding slabs in the buffer entries,
   wherein each processing circuit checks, when demand-fetching data from a first slab among corresponding slabs, a prefetch trigger bit of a first buffer entry in which the first slab is included, determines, when it is determined that the prefetch trigger bit is set, whether all data stored in a plurality of slabs included in a second buffer entry is demand-fetched, and triggers, when it is determined that all the data is demand-fetched, the prefetch circuit to perform prefetch of subsequent data to the second buffer entry.

2. The data processing system according to claim 1, wherein the prefetch circuit controls the memory device to prefetch data from the memory device by unit of buffer entry and controls the buffer circuit to store the prefetched data in a prefetch target buffer entry among the buffer entries within the buffer circuit, and controls the buffer circuit to set a prefetch trigger bit of the prefetch target buffer entry.

3. The data processing system according to claim 1, wherein each processing circuit clears, when triggering the prefetch of the subsequent data to the second buffer entry, the prefetch trigger bit.

4. The data processing system according to claim 1, wherein each processing circuit does not trigger the prefetch of the subsequent data to the second buffer entry, when it is determined that the prefetch trigger bit is cleared.

5. The data processing system according to claim 1, wherein each processing circuit does not trigger the prefetch of the subsequent data to the second buffer entry, when it is determined that not all the data is demand-fetched from the second buffer entry.

6. The data processing system according to claim 1, wherein each processing circuit increases a demand fetch count of the first buffer entry when demand-fetching the data stored in the first slab.

7. The data processing system according to claim 1, wherein each processing circuit determines whether all the data is demand-fetched, by determining whether a demand fetch count of the second buffer entry has reached a maximum demand fetch count.

8. The data processing system according to claim 7, wherein the maximum demand fetch count corresponds to a number of the plurality of slabs included in the second buffer entry.

9. The data processing system according to claim 1, wherein each processing circuit determines, when it is determined that the prefetch trigger bit is set, whether all the data is demand-fetched or whether the second buffer entry is empty.

10. The data processing system according to claim 9, wherein each processing circuit triggers the prefetch of the subsequent data to the second buffer entry when it is determined that the second buffer entry is empty.

11. A method for operating a data processing system, comprising:
    demand-fetching and processing data stored in a first slab among a plurality of slabs included in a first buffer entry;
    checking a prefetch trigger bit of the first buffer entry when demand-fetching the data stored in the first slab;
    determining, when it is determined that the prefetch trigger bit is set, whether all data stored in a plurality of slabs included in a second buffer entry is demand-fetched; and
    triggering, when it is determined that all the data is demand-fetched, prefetch of subsequent data to the second buffer entry.

12. The method according to claim 11, further comprising:
    setting the prefetch trigger bit when prefetching data from a memory device by unit of buffer entry and storing the data in the plurality of slabs included in the first buffer entry.

13. The method according to claim 11, further comprising:
    clearing the prefetch trigger bit when triggering the prefetch of the subsequent data to the second buffer entry.

14. The method according to claim 11, further comprising:
    not triggering the prefetch of the subsequent data to the second buffer entry, when it is determined that the prefetch trigger bit is cleared.

15. The method according to claim 11, further comprising:
    not triggering the prefetch of the subsequent data to the second buffer entry, when it is determined that not all the data is demand-fetched.

16. The method according to claim 11, further comprising:
    increasing a demand fetch count of the first buffer entry when demand-fetching the data stored in the first slab.

17. The method according to claim 11, wherein the determining of whether all the data is demand-fetched comprises:
    determining whether all the data is demand-fetched, by determining whether a demand fetch count of the second buffer entry has reached a maximum demand fetch count.

18. The method according to claim 17, wherein the maximum demand fetch count corresponds to a number of the plurality of slabs included in the second buffer entry.

19. The method according to claim 11, further comprising:
    determining, when it is determined that the prefetch trigger bit is set, whether the second buffer entry is empty.

20. The method according to claim 19, further comprising:
    triggering the prefetch of the subsequent data to the second buffer entry when it is determined that the second buffer entry is empty.

* * * * *